(No Model.)

A. HARRIS & G. M. CLARK.
LOCOMOTIVE HEAD LIGHT.

No. 270,793. Patented Jan. 16, 1883.

Witnesses
W. T. Cole
E. L. White

Inventors,
Arthur Harris
George M. Clark
by W. T. Howard
Attys

UNITED STATES PATENT OFFICE.

ARTHUR HARRIS AND GEORGE M. CLARK, OF CHICAGO, ILLINOIS, ASSIGNORS TO J. McGREGOR ADAMS, OF SAME PLACE.

LOCOMOTIVE HEAD-LIGHT.

SPECIFICATION forming part of Letters Patent No. 270,793, dated January 16, 1883.

Application filed November 28, 1882. (No model.)

*To all whom it may concern:*

Be it known that we, ARTHUR HARRIS and GEORGE M. CLARK, both of Chicago, in the county of Cook and State of Illinois, have invented certain Improvements in Locomotive Head-Lights, of which the following is a specification.

This invention relates to improvements in means for displaying signals on locomotive head-lights; and, briefly considered, it consists in throwing light from within the head-light or lantern into a box having its entire rear side open to confront the illuminative area bounded by the rim of the head-light, and provided with one or more colored transparent plates in its front side or wall, said box being adapted to be raised or lowered in a plane parallel to that of the front edge of the rim and its white glass, or otherwise removed from and placed before the front of the white glass, as hereinafter specified.

Figure 1:
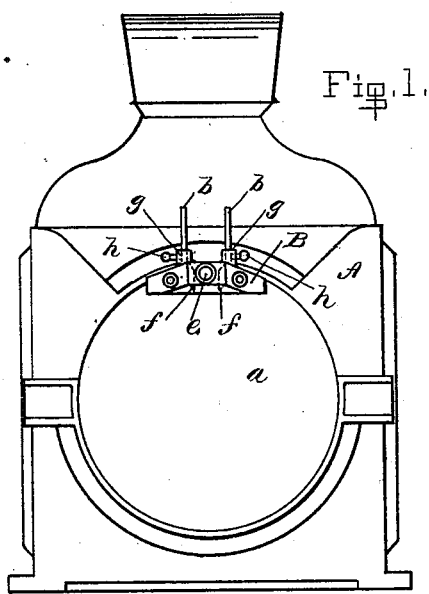
Figure 2:
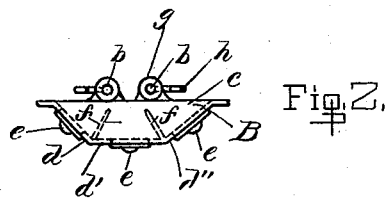

In the accompanying drawings, Figure 1 is a front view of our improved head-light. Fig. 2 is a top or plan view of the box above referred to.

Similar letters of reference indicate similar parts in both figures.

A is the outer casing of the head-light or lantern, $a$ representing the area within the rim illuminated by the lamp and main reflector. Two standards, $b\ b$, are secured to the upper part of the rim or other portion of the head-light.

B is a box having its rear side open, as shown at $c$ in Fig. 2, its front comprising three sides, $d\ d'\ d''$, in each of which is inserted a bull's-eye, $e$. Instead of the bull's-eyes, flat glasses of any suitable outline shape, and bearing, if desired, a number or other mark, may be employed. Reflectors $f\ f$ may be arranged to project inwardly from the front surface, $d'$, of the box B, so as to aid in transmitting light from the main reflector through the two outer bull's-eyes or signal-glasses $e$. The central bull's-eye will then receive its light directly from the lamp and main reflector. The reflectors within the box may be, however, otherwise placed. At the top of the box B and attached thereto are bosses or collars $g\ g$, which are fitted over the standards $b\ b$, and secured to them, so as to maintain the box B in the desired position, by set-screws $h\ h$. As shown in Fig. 1, the box B is in place for signaling purposes. When the box is not in use it may be slid up upon the standards $b\ b$, so as to remove it from the area within or inclosed by the rim. The box may, if preferred, be hinged to the upper part of the rim or other portion of the head-light and the standards $b\ b$ dispensed with. If so hinged, the box, when not in use, may be thrown back above the rim. The bull's-eyes or glasses may be made removable from the box in order that signals of different colors may be exhibited.

Our improvement is applicable to any head-light ordinarily used.

We claim as our invention—

1. The combination, with a locomotive head-light, of a box having an open rear side, and provided with signal-glasses, and with means for adjustment to cause practically its entire rear open side to confront the area inclosed by the rim, substantially as set forth.

2. The combination, with a locomotive head-light, of a box having an open rear side, and provided with signal-glasses and interior reflecting-surfaces, and with means for adjustment to cause practically its entire rear open side to confront the area inclosed by the rim, substantially as set forth.

3. A locomotive head-light provided with standards at its front portion, combined with a box having an open rear side, front signal-glasses, and interior reflecting-surfaces, and means for adjusting the box vertically upon said standards, substantially as set forth.

4. Combined with a locomotive head-light, a box having an open rear side and a front angular surface provided with signal-glasses, and having, further, interior reflecting-surfaces, said box being provided with means for adjustment to and from the illuminative area bounded by the rim of the head-light, substantially as set forth.

In testimony whereof we have hereunto set our hands and seals this 22d day of November, 1882.

ARTHUR HARRIS. [L. S.]
GEO. M. CLARK. [L. S.]

Witnesses:
LAURENCE BROWN,
OSBORNE SAMPSON.